June 3, 1969 — R. M. DURIS — 3,448,307
BELL STRIKER RECIPROCATING MOTOR
Filed Sept. 6, 1966 — Sheet 1 of 2
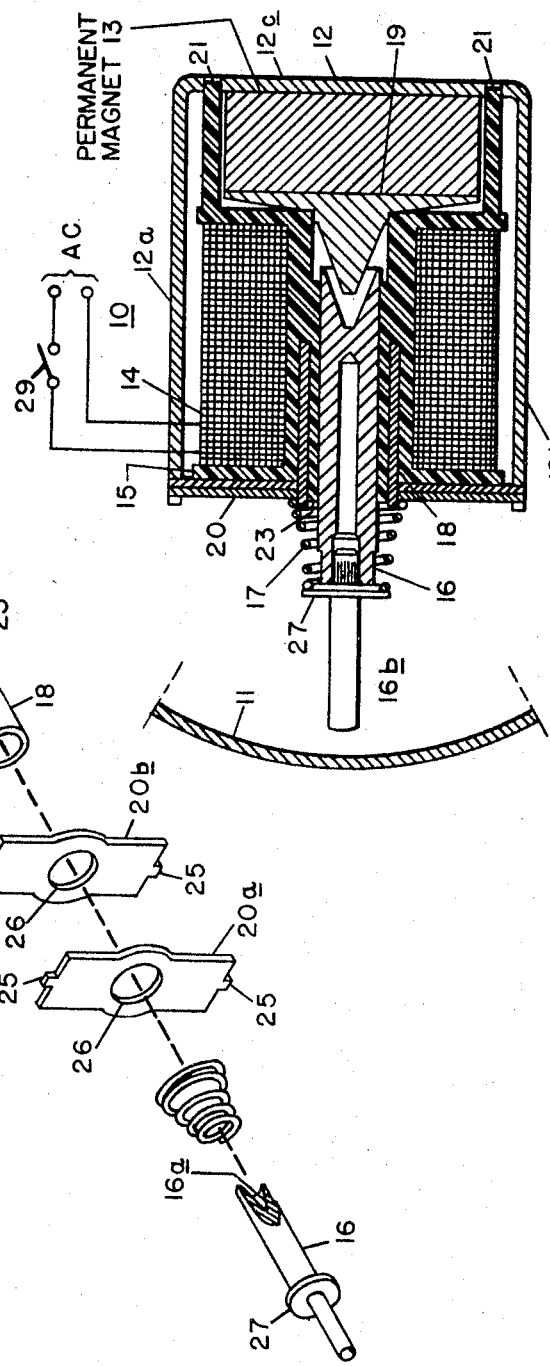
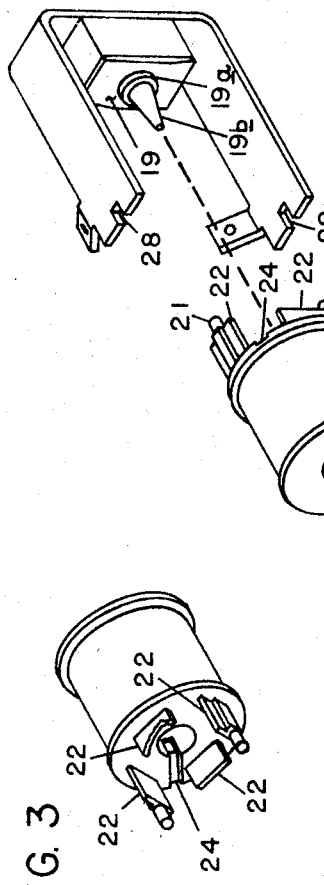
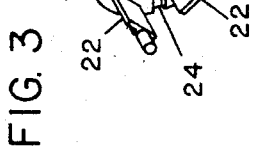
INVENTOR.
R. M. DURIS
BY Forest B. Hitchcock
HIS ATTORNEY United States Patent Office 3,448,307
Patented June 3, 1969

3,448,307
BELL STRIKER RECIPROCATING MOTOR
Rudolph M. Duris, Norwalk, Conn., assignor to Edwards Company, Inc., Norwalk, Conn., a corporation of Connecticut
Filed Sept. 6, 1966, Ser. No. 577,237
Int. Cl. H02k 33/02, 35/02
U.S. Cl. 310—23                                    10 Claims

ABSTRACT OF THE DISCLOSURE

An alternating current bell striker motor having a permanent magnet and an electromagnet acting upon a reciprocating plunger. A spool supports a winding of the electromagnet and has a sleeve formed therein for receiving the plunger. The spool has flanges extending from one end for retaining the permanent magnet in alignment with the longitudinal axis of the plunger.

---

This invention relates to bell striker reciprocating motors, and it more particularly pertains to a bell striker reciprocating motor operated by the joint magnetic efforts of a permanent magnet and an electromagnet energized with alternating current.

Alternating current bell striker reciprocating motors, of a class to which the present invention relates, actuate a bell striking plunger longitudinally at a frequency corresponding to the frequency of alternating current energizing an electromagnet. The plunger is biased in one direction by a permanent magnet and in the opposite direction by a compression spring. The electromagnet sets up a magnetic field that alternately aids and opposes a magnetic field set up by the permanent magnet and extending through the plunger. By this magnetic structure, the force attracting the plunger is alternately of high and low value at a frequency corresponding to the frequency of the alternating current. The plunger is thus reciprocated at this frequency. One of the problems encountered in this type of structure has been the efficiency of the system to obtain the force and stroke required of the plunger for satisfactory bell operation.

The bell striker reciprocating motor according to the present invention provides for much louder and more dependable bell operation, without increasing the size or electrical power requirements of the reciprocating motor. This improved mode of operation is obtained in part by materially decreasing friction and wear due to lateral magnetic attraction of a motor plunger within a nonmagnetic sleeve. The magnetic circuit for the plunger is improved to avoid concentration of flux between one end of the plunger and a pole piece so as to heavily attract the plunger against the inner wall of the nonmagnetic sleeve at this point. It is further provided that the bearing portion of the nonmagnetic sleeve is fully between both ends of the plunger under all operating conditions. Thus preventing friction due to the ends of the plunger attempting to dig into the inner surface of the nonmagnetic sleeve. Friction between the plunger and the nonmagnetic sleeve is further reduced by using the biasing spring to journal one end of the plunger as a means of maintaining that end of the plunger in axial alignment with the nonmagnetic sleeve to overcome any unbalancing of lateral magnetic effects of the magnetic circuit upon the plunger at that end.

The system according to the present invention also obtains improved plunger operation because of balancing characteristics of the spring in acting on the plunger against the characteristics of the permanent magnet to attract the plunger in such a manner that the plunger is operated with maximum force and stroke and the resultant characteristics of the force on the plunger are substantially linear throughout the operating range of the plunger.

An object of the present invention is to provide an improved reciprocating bell striker motor.

Other objects, purposes and characteristic features of the present invention will be in part obvious from the accompanying drawings, and in part pointed out as the description of the invention progresses.

In describing the invention in detail, reference is made to the accompanying drawings wherein similar reference characters are used to designate corresponding parts throughout the several illustrations, and wherein:

FIG. 1 is an elevational view of a bell striker reciprocating motor constructed according to the principles of the present invention;

FIG. 2 is an exploded perspective view, partly in cross-section, of the bell striker motor of FIG. 1 as viewed from the left-hand end of FIG. 1;

FIG. 3 is a perspective view of a spool and winding of the bell striker motor of FIG. 1 as viewed from the right-hand end of the spool as shown in FIG. 1.

Figure 4:
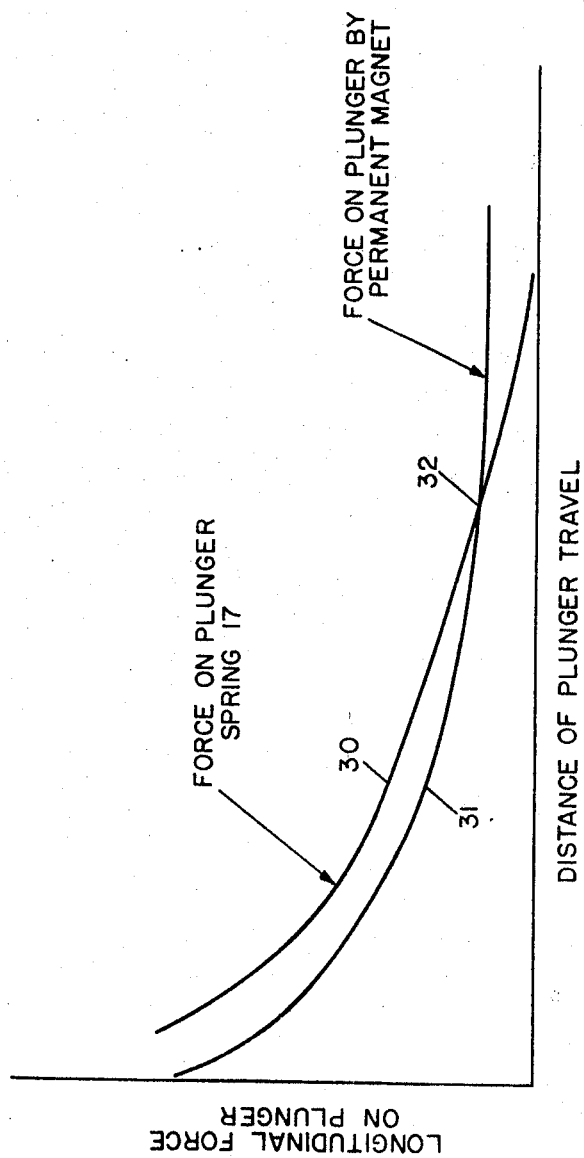
FIG. 4 is a graph illustrating force characteristics of a reciprocating plunger when biased by a conical spring and a permanent magnet respectively.

With reference to FIG. 1, a bell striker reciprocating motor 10 is illustrated as one embodiment of the present invention for striking a bell 11. The motor 10 comprises a U-shaped magnetic structure 12, a permanent magnet 13 adjoining the U-shaped structure, an electromagnet within the U-shaped structure having a winding 14 on a spool 15, a reciprocating plunger 16 inserted within the spool 15, a compression spring 17 for biasing the plunger 16 in opposition to the permanent magnet 13, a sleeve 18 of magnetic material inserted into the spool 15 and pole pieces 19 and 20 of magnetic material.

The U-shaped magnetic structure 12, is formed with upper and lower spaced parallel legs 12a and 12b respectively, which are connected at their right-hand ends by an end portion 12c. The end portion 12c has upper and lower openings formed therein for receiving detents 21 formed in the spool 15.

The permanent magnet 13 is illustrated as being of rectangular shape, and is maintained adjoining the end portion 12c within the U-shaped magnetic structure by magnetic attraction. The permanent magnet 13 is also maintained in proper position by flanges 22 formed in the right-hand end of the spool 15. The permanent magnet 13 is shorter than the space between the legs 12a and 12b of the U-shaped magnetic structure 12, and it is magnetized in a manner so that one pole is adjoining the end portion 12c of the U-shaped magnetic structure 12 and the other pole is adjoining the pole piece 19.

The pole piece 19 is constructed of magnetic material and is formed to have a rectangular flat right-hand surface of a size and shape corresponding to the cooperating face of the permanent magnet 13. This surface is constructed to taper toward the upper and lower edges of the permanent magnet 13 for the purpose of reducing the flux leakage between the pole piece 19 and the legs 12a and 12b of the U-shaped magnetic frame at times when there is a magnetic path of relatively low reluctance for the permanent magnet 13 through the plunger 16. The pole piece 19 is maintained in position by the flanges 22 of the spool 15. The left-hand face of the pole piece 19 is formed with a short cylindrical portion 19a which fits into a central opening in the spool 15. There is a conical portion 19b which is concentric with the opening in the spool 15 and with the axis of the plunger 16 and extends within a cooperating conical opening 16a of the plunger 16 to cooperate with the plunger 16 through an operating air gap. An angle of taper for the conical portion 19b that has been found to be desirable is an angle of approximately 30°.

The spool 15 is formed with a central sleeve 23 of non-magnetic material for receiving and guiding the plunger 16. The right-hand portion of the sleeve 23 is made larger in inside diameter than the outside diameter of the plunger 16 for the purpose of reducing wear of the sleeve 23 by providing that the right-hand end of the plunger 16 never touches the inner surface of the sleeve 23 in operation, and thus the right-hand edge of the plunger 16 cannot dig into and wear the inner surface of the sleeve 23. A longitudinal slot 24 is formed within the sleeve 23 and extends across the right-hand end of the spool 15 as is illustrated in FIG. 3 for the purpose of permitting the free passage of air in and out of the area within the spool 15 adjoining the end of the plunger 16. The spool 15 is also formed with a cylindrical recess from its left-hand end extending substantially to a central portion of the spool 15 for receiving the sleeve 18. To facilitate assembly of the sleeve 18 within the spool 15, it is preferable that the sleeve 18 can be inserted by hand within the spool 15 without the use of tools.

The pole piece 20 is formed of laminations 20a and 20b to reduce eddy current losses. The laminations 20a and 20b have detents 25 formed in the upper and lower ends thereof which fit into cooperating slots formed in the ends of the legs 12a and 12b of the U-shaped magnetic structure 12. These detents locate the pole piece 20 in a central position across the left-hand ends of the legs 12a and 12b, and suitable openings 26 are formed in the laminations 20a and 20b for journaling the sleeve 18 and the spool 15 at their left-hand ends.

The compression spring 17 is preferably conical in shape as illustrated, with the large end of the spring being journaled on a portion of or adjoining the magnetic sleeve 18 which extends through the pole piece 12, and the small end of the spring being journaled on a step in a washer stop 27 which is assembled at the left-hand end of the plunger 17 between that end and a bell striker 16b which is assembled by a forced fit within an opening formed in the left-hand end of the plunger 16. Thus the spring 17 journals the left-hand end of the plunger 16 to maintain the plunger in alignment concentric with the sleeve 28 and within the sleeve 23 of the spool 15. The plunger 16 is retained within the sleeve 23 by attraction of the permanent magnet 13, and the spring 17 maintains the spool 15 within the U-shaped magnetic structure 12 and maintains the pole pieces in place without any further assembly operation. It is desirable, however, before operating the reciprocating motor that the parts be mechanically locked in their assembled position by staking the slots 28 partially closed over the detents 25 of the pole piece 20.

The sleeve 18 is made relatively long to reduce concentration of flux at a point of magnetic linkage of the plunger 16 to the pole piece 20. A purpose for this relatively long sleeve is to reduce friction between the plunger and its guiding sleeve 23 by avoiding concentration of flux which could provide a strong lateral pull on the plunger 16. Thus, by using the sleeve 18 of magnetic material within the electromagnet, there is no concentration of flux to heavily attract the plunger against the non-magnetic sleeve at any point along the left-hand end of the winding as there is a flux path from the plunger 16 along the entire length of the sleeve 18 for flux distribution at low density.

The placement of the sleeve 18 within the winding is also for the purpose of improving the efficiency of the motor by keeping the magnetic circuits of both the permanent magnet and the electromagnet as short as possible. It will be noted that the sleeve 18 is inserted only about half way through the winding 14 of the electromagnet. This is so that the sleeve 18 will not interfer with concentration of flux in the working air gap between the right-hand end of the plunger 16 and the conical pole piece 19. The flux in this air gap is characteristic of the operating power of the motor. The flux path extends transversely between the plunger 16 and the sleeve 18 and along the sleeve longitudinally to the pole piece 20. Thus the flux becomes more concentrated in the cross-section of the sleeve 18 adjoining the pole piece 20, and it is this flux density that determines the cross-section area required for the sleeve 18.

When the bell striker reciprocating motor 10 is in its deenergized condition, as is illustrated in FIG. 1, the plunger 16 is attracted by the permanent magnet 13 and thus compresses the spring 17 to a certain extent and partially closes the operating air gap at the right-hand end of the plunger. The magnetic circuit by which the plunger 16 is attracted under these conditions extends from the left-hand side of the permanent magnet through the pole face 19, plunger 16, magnetic sleeve 18, pole piece 20, and U-shaped magnetic structure 12 to the right-hand side of the permanent magnet 13.

It will be apparent from the description of the motor 10 as it has been set forth that the permanent magnet 13 and the spring 17 act in opposition to each other to determine the longitudinal movement of the plunger 16. The forces of these elements on the plunger both vary exponentially so as to provide for smooth operation of the plunger when the electromagnet is energized. The characteristic forces of the spring and permanent magnet on the plunger when taken separately are plotted according to FIG. 4 wherein the curve 30 represents the force of the spring 17 tending to operate the plunger 16 longitudinally to the left at various points in the travel of the plunger, and similarly the curve 31 represents the force exerted on the plunger 16 to attract it longitudinally to the right at different positions in the travel of the plunger 16. It will be noted by a comparison of the curves 30 and 31 that these curves represent similar variations for distance of plunger travel of force on the plunger 16, particularly where the force on the plunger is relatively high. The point 32 where the curves 30 and 31 cross represents the point in travel of the plunger 16 wherein the force of the spring 17 balances the force of the permanent magnet 13 when no energy is applied to the electromagnet. This balance of forces causes the plunger 16 to be normally positioned, with the electromagnet deenergized, as is illustrated in FIG. 1, wherein there is an operating air gap at the right-hand end of the plunger, and the spring 17 is maintained under a certain degree of compression by attraction of the plunger 16 in the magnetic circuit of the permanent magnet 13. This is a normal or center point from which the plunger 16 is operated to the right when the flux of the electromagnet aids the flux of the permanent magnet 13 and to the left by the force of the spring when the flux of the electromagnet opposes the flux of the permanent magnet. The resultant forces upon the plunger 16, using the conical spring 17 having characteristics as illustrated by the curve 30, provide for linear operating characteristics of the plunger 16, which permits the plunger to follow a 60 cycles alternating current frequency and remain in synchronism with this frequency.

To operate the motor 10, alternating current is applied from a suitable source through the switch 29 to the winding 14. The energization of the electromagnet by this source of energy sets up a magnetic field through the plunger 16 that alternately aids and opposes the magnetic field of the permanent magnet 13 in a magnetic circuit that has been described. The degree of energization of the electromagnet is so chosen that the permanent magnet 13 is never overpowered during the half cycle in which the electromagnet opposes the permanent magnet, but rather the effect of the electromagnet during this opposing half cycle is to reduce the permanent magnet flux passing through the plunger 16 materially by effectively increasing the reluctance of the magnetic circuit for the flux of the permanent magnet through the plunger 16. This causes more flux leakage from the left-hand pole of the permanent magnet through the upper and lower portions of the pole piece 19 and through the U-shaped magnetic structure to the right-hand pole of the permanent magnet 13.

The energization of the electromagnet therefore serves to effectively alternately increase and decrease the reluctance of the magnetic circuit of the permanent magnet 13 through the plunger 16 so as to alternately produce high and low flux density within the operating air gap between the right-hand end of the plunger 16 and the pole piece 19. The location of this air gap is such that it comes substantially at a dividing line when the flux of the electromagnet opposes the flux of the permanent magnet wherein the flux of the permanent magnet follows a path of less reluctance through the extremities of its pole piece 19 and through the U-shaped magnetic structure 12 as has been described. By locating the operating air gap at this point, there is a minimum flux density at the point of the air gap acting to attract the plunger 16 when the flux of the electromagnet opposes the flux of the permanent magnet. In addition to the operating air gap being located at a point where the flux density will be at a minimum during the time when the electromagnet opposes the permanent magnet 13, this air gap is also located at a central point relative to the operating magnetic circuit wherein the flux of the electromagnet is aiding the flux of the permanent magnet 13. This provides for maximum flux density during the portion of the cycle of operation wherein the plunger 16 is operated in a right-hand direction from its normal position as shown in FIG. 1.

It will be readily apparent that in this type of a reciprocating motor, the plunger 16 is reciprocated at a high rate of speed, and frequent operation of the motor can cause wear of the sleeve 23 and reduce the efficiency of motor operation by the failure to hold the plunger 16 in a proper axis that is common to the plunger 16, the sleeve 18 and the pole piece 19. To reduce this wear, several steps have been taken to reduce the wear on the sleeve 23. One of these steps has been to provide a bore of larger diameter extending from the right-hand end of the spool to a point beyond the right-hand end of the plunger 16, as been described, for the purpose of preventing the right-hand end of the plunger 16 from touching the inner wall of the sleeve 23. This eliminates the possibility of the right-hand end of the plunger 16 causing wear of the inner wall of the sleeve 23, thus reducing the efficiency of the motor. Inasmuch as the left-hand end of the plunger 16 extends outside of the sleeve 23, it is provided that the sleeve 23 covers only an intermediate area of the plunger 16 and thus cannot be worn by the ends or shoulders of the sleeve 16. Wear on the inner surface of the sleeve 23 near its left-hand end is greatly reduced by journaling the left-hand end of the plunger 16 by the spring 17 so as to mechanically bias the left-hand end of the plunger 16 in a position along the axis of the guiding sleeve 23, irrespective of the position of mounting of the motor 10 and the corresponding effect of gravity on the plunger 16. The reduction of wear on the plunger 16 as described not only materially increases the life of the motor 10, but it also provides for more efficient operation and louder bell ringing characteristics of the motor for the same amount of energization. This is because friction of the plunger 16 within the sleeve 23 has a material bearing upon the force by which the striker 16b will hit the bell 11, particularly due to the high speed of actuation required to follow the 60 cycle alternating current frequency. The plunger 16 is preferably formed with a central longitudinal opening as is illustrated in FIG. 1 to reduce the weight of the armature and thereby facilitate its operation to follow the 60 cycle frequency.

Having thus described one embodiment of a bell striker reciprocating motor, it is to be understood that this form has been selected for the purpose of facilitating disclosure of the present invention, rather than to limit the number of forms the present invention may assume. While the invention has been described in its preferred embodiment, it is to be understood that the words which have been used are words of description rather than of limitation, and that changes within the purview of the appending claims may be made without departing from the true spirit and scope of the invention in its broader aspects.

What I claim is:

1. A bell striker reciprocating motor comprising, an electromagnet having a winding and a longitudinally operable solenoid plunger passing within the winding, a permanent magnet at one end of the winding biasing the plunger toward that end, a spring at the other end of the winding biasing the plunger in opposition to attraction by the permanent magnet, whereby the solenoid plunger is actuated with a reciprocating longitudinal movement when the electromagnet is energized with alternating current, and a spool for supporting the winding, said spool having flanges extending from said one end of the winding for retaining the permanent magnet in alignment with the axis of the spool.

2. The invention according to claim 1 wherein the plunger is journaled at said other end by one end of the spring.

3. The invention according to claim 1 wherein the bias of the spring and of the permanent magnet upon the plunger both vary exponentially throughout the operating stroke of the plunger and thus provide for substantially linear operation of the plunger.

4. A bell striker reciprocating motor comprising, an electromagnet having a winding, a spool for supporting the winding having flanges extending from one end thereof, a longitudinally operable solenoid plunger slidably disposed in a nonmagnetic sleeve formed within the spool, a permanent magnet at said one end of the spool for biasing the plunger towards that end, the permanent magnet being retained between said flanges, a pole piece of magnetic material adjoining the permanent magnet and extending partly within the sleeve for magnetically attracting one end of the plunger through an operating air gap, and a spring at the other end of the sleeve for journaling the plunger at that end and for biasing the plunger in opposition to attraction by the permanent magnet, whereby the plunger is actuated with a reciprocating longitudinal movement when the electromagnet is energized with alternating current and whereby the journaling of the plunger at said other end reduces friction between the plunger and the sleeve.

5. The invention according to claim 4 wherein the portion of the pole piece extending within the sleeve has a conical shape and wherein said one end of the plunger has a conical shape for cooperating axially with the conical pole piece through the operating air gap.

6. The invention according to claim 4 wherein the sleeve is larger in diameter at said one end in a portion overlapping with the corresponding end of the plunger.

7. A bell striker reciprocating motor comprising, an integral U-shaped structure of magnetic material for forming part of a magnetic circuit having spaced parallel disposed longitudinal legs connected at one end by a transverse end portion having a plurality of spaced openings formed therein, a permanent magnet adjoining the end portion and disposed between the legs of the magnetic structure but spaced therefrom, an electromagnet disposed between the legs of the magnetic structure and adjoining the permanent magnet having a winding on a spool of non-magnetic material, the spool having flanges on one end thereof extending on opposite ends of the permanent magnet for retaining the permanent magnet in a fixed position adjoining the end portion and the spool having detents extending within the openings in the end portion of the U-shaped structure for axially locating one end of the spool within the U-shaped structure, a pole piece of magnetic material connecting the other ends of the legs of the U-shaped structure having a central opening formed therein for journaling the other end of the spool, a plunger of magnetic material slidable axially within a sleeve formed through the spool in accordance with attraction by the permanent magnet and the electromagnet, and a compression spring disposed between the pole piece and a stop on the plunger for biasing the plunger axially in opposition to the permanent magnet.

8. The invention according to claim 7 wherein a sleeve of magnetic material adjoins the pole piece and is inserted over the sleeve of the spool and at least partly within the winding for providing a relatively low reluctance magnetic circuit connection within the winding from the plunger to the pole piece.

9. The invention according to claim 8 wherein the magnetic sleeve extends through the central opening of the pole piece.

10. The invention according to claim 9 wherein the compression spring is a coil spring having a winding tapered in diameter for generating a force upon compression that varies exponentially and wherein the large end of the spring adjoins the pole piece and the small end of the spring journals the plunger.

References Cited

UNITED STATES PATENTS

| | | |
|---|---|---|
| 2,561,355 | 7/1951 | Fish. |
| 1,436,639 | 11/1922 | Bindschedler _____ 335—262 |
| 3,274,525 | 9/1966 | Valleau _____ 335—255 |
| 3,139,565 | 6/1964 | Levine _____ 340—397 XR |
| 2,205,189 | 6/1940 | Edwards _____ 340—392 |
| 3,331,042 | 7/1967 | Erickson et al. ____ 335—262 XR |
| 3,018,418 | 1/1962 | Conrad _____ 317—123 |
| 2,726,342 | 12/1955 | Covetto _____ 310—30 |
| 2,383,411 | 8/1945 | Obszarny _____ 301—30 XR |

FOREIGN PATENTS 421,297  3/1967  Switzerland.

MILTON O. HIRSHFIELD, *Primary Examiner.*

B. A. REYNOLDS, *Assistant Examiner.*

U.S. Cl. X.R.

310—30